United States Patent
Saito et al.

(10) Patent No.: US 7,042,491 B2
(45) Date of Patent: May 9, 2006

(54) IMAGE SIGNAL OUTPUT METHOD, IMAGE SIGNAL OUTPUT DEVICE, RANGEFINDER, AND IMAGING DEVICE

(75) Inventors: Hiroyuki Saito, Chiba-ken (JP); Aijiro Gohara, Chiba-ken (JP)

(73) Assignee: SEIKO Precision Inc., Chiba-ken (JP)

( * ) Notice: Subject to any disclaimer, the term of this patent is extended or adjusted under 35 U.S.C. 154(b) by 593 days.

(21) Appl. No.: 10/037,241

(22) Filed: Jan. 3, 2002

(65) Prior Publication Data
US 2002/0126205 A1     Sep. 12, 2002

(30) Foreign Application Priority Data
Jan. 19, 2001     (JP)     ............... 2001-011841

(51) Int. Cl.
*H04N 7/18*     (2006.01)
*G03B 13/18*     (2006.01)
*G03B 13/20*     (2006.01)

(52) U.S. Cl. ............. 348/139; 341/120; 356/3.13; 396/89; 396/140

(58) Field of Classification Search ............ 396/89, 396/139, 140; 356/3, 3.13; 348/139, 572; 341/108, 110, 120, 121
See application file for complete search history.

(56) References Cited

U.S. PATENT DOCUMENTS

| | | | | |
|---|---|---|---|---|
| 4,652,119 A | * | 3/1987 | Suzuki et al. | 356/3.15 |
| 5,483,336 A | * | 1/1996 | Tocher | 356/3.15 |
| 5,721,977 A | * | 2/1998 | Yamawaki et al. | 396/92 |
| 6,263,164 B1 | * | 7/2001 | Nakahara et al. | 396/104 |

* cited by examiner

*Primary Examiner*—Gims Philippe
*Assistant Examiner*—Erick Rekstad
(74) *Attorney, Agent, or Firm*—Jordan and Hamburg LLP (57) ABSTRACT

An image signal output device for use in a passive range finder. The device can correct the sensitivities of sensor arrays according to the amount of incident light. The output device has line sensor portions that produce pixel outputs. An A/D converter portion A/D converts these pixel outputs. At this time, the A/D conversion range of the A/D converter portion is modified according to the difference in sensitivity between the line sensor portions.

4 Claims, 6 Drawing Sheets

IMAGE SIGNAL OUTPUT METHOD, IMAGE SIGNAL OUTPUT DEVICE, RANGEFINDER, AND IMAGING DEVICE

BACKGROUND OF THE INVENTION

1. Field of the Invention

The present invention relates to a method of outputting an image signal, device for outputting an image signal, rangefinder, and imaging device and, more particularly, to a method of outputting an image signal, device for outputting an image signal, rangefinder, and imaging device used in an autofocus camera or the like.

2. Description of the Related Art

Figure 7:
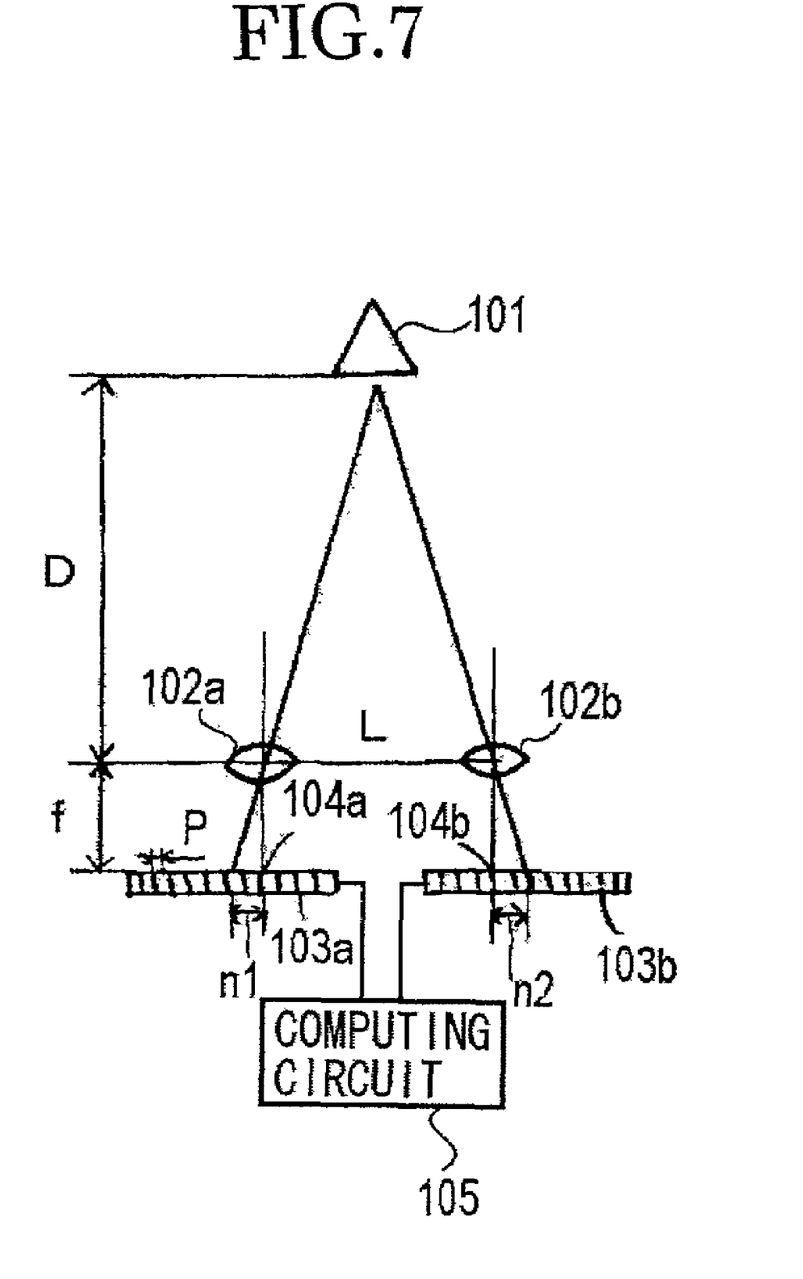
FIG. 7 is a diagram illustrating the configuration and the principle of a passive rangefinder of related art.

Conventionally, a so-called passive rangefinder making use of an image signal output device having a plurality of arrays of light-receiving portions is available as disclosed, for example, in Japanese Patent Publication No. 67203/1991. The principle of range finding of this related art is briefly described by referring to FIG. 7. An image of a subject or an object under measurement 101 is focused onto sensor arrays 103a and 103b via light-receiving lenses 102a and 102b. Reference positions 104a and 104b (hereinafter referred to as "the pair of reference positions") are set on the sensor arrays 103a and 103b, respectively. This pair of reference positions corresponds to a position where the image is focused if the subject 101 is at infinity. The range to the subject 101 is measured using the principle of triangulation. In particular, where the range (i.e., the distance from the light-receiving lenses 102a, 102b to the subject 101) to be found is D, if images of the subject on the sensor arrays 103a and 103b are focused at a position spaced from the pair of reference positions by a distance equal to n (=n1+n2) pixels, the following equation holds:

$$D = \frac{(L \times f)}{(p \times n)} \quad (1)$$

where L is the baseline length of the light-receiving lenses, f is the focal distance of the optical lenses, and p is the pitch of the pixels of the light-receiving elements. Since the baseline length L of the light-receiving lenses, the focal distance f of the optical lenses, and the pitch p of the pixels of the light-receiving elements are constants, the distance D can be determined by detecting the number n of the pixels corresponding to the deviation of the subject images on the sensor arrays from the pair of reference positions. A general method of detecting this amount of deviation consists of quantizing the outputs from the sensor arrays 103a, 103b by a computing circuit 105, performing a correlation calculation about the data obtained by the quantization, and finding the amount of deviation from the results of the correlation.

In this passive rangefinder, the difference in sensitivity between the pair of sensor arrays adversely affects the calculation of the correlation, thus deteriorating the rangefinding accuracy. A technique for correcting the sensitivity difference between the pair of sensor arrays is disclosed, for example, in Japanese Laid Open Patent Publication No. 146572/2000. This disclosed technique consists of storing data for correction of sensitivity corresponding to the sensitivity difference into a memory and adding the data for correction of the sensitivity to, or subtracting the data from, the outputs from the sensor arrays. The sensitivity correction data stored into the memory corresponds to the output difference between the sensor arrays when uniform measuring light of given brightness is made to hit the sensor arrays, i.e., fixed values are adopted.

With the aforementioned sensitivity difference correction technique (i.e., sensitivity correction data about fixed values is added to, or subtracted from, the outputs from the sensor arrays), however, any appropriate correction cannot be made for normal sensor arrays producing outputs whose difference increases with increasing the incident light amount. For example, where the technique is applied to a pair of sensor arrays whose outputs are both zero when no incident light amount is present and the difference between the outputs increases with increasing the amount of incident light, the problem that sensitivity correction data about fixed values in the absence of incident light amount appear directly as output values takes place. This makes it impossible to make an appropriate correction. Therefore, where the aforementioned sensitivity difference correction technique is applied to a rangefinder using these sensor arrays, a subject of given brightness can be corrected for sensitivity at high accuracy when sensitivity correction data is created. However, subjects of other brightness cannot be corrected for sensitivity at high accuracy. That is, the sensitivity cannot be corrected according to the amount of incident light. Accordingly, where the sensitivity difference correction technique mentioned above is used, the rangefinding accuracy will vary according to the incident light amount. Also, in a focusing device for focusing the objective lens based on the output of a rangefinder, improvement of the focusing accuracy will not be expected.

SUMMARY OF THE INVENTION

It is an object of the present invention to provide an image signal output method capable of correcting the sensitivities of sensor arrays according to the amount of incident light, image signal output device, rangefinder capable of providing improved rangefinding accuracy, and imaging device capable of providing improved focusing accuracy.

A first embodiment of the present invention is a method of outputting an image signal, the method comprising the steps of: focusing an image from a subject onto a pair of sensor arrays each consisting of a plurality of light-sensitive cells; quantizing outputs from the light-sensitive cells contained in a quantization and conversion range of each sensor array having a preset width; and varying the width of the quantization and conversion range according to the difference in sensitivity between the sensor arrays or between the light-sensitive cells during the quantization. This method can correct the sensitivities of the sensor arrays according to the amount of incident light.

A second embodiment of the invention is a device for carrying out the above-described method and comprises: a pair of sensor arrays each consisting of a plurality of light-sensitive cells onto which an image of a subject is focused; and a quantization portion for quantizing outputs from the light-sensitive cells contained in a quantization and conversion range of each sensor array having a preset width. The quantization portion includes means for varying the width of the quantization and conversion range according to the difference in sensitivity between the sensor arrays or between the light-sensitive cells during the quantization. In this configuration, the width of the quantization and conversion range is varied according to the difference in sensitivity between the sensor arrays or between the light-sensitive cells. Therefore, the sensitivities of the sensor arrays or light-sensitive cells can be corrected according to the amount of incident light by quantizing the output from each light-sensitive cell by the quantization portion.

A third embodiment of the invention is an image signal output device comprising: a pair of sensor arrays each consisting of a plurality of light-sensitive cells onto which an image from a subject is focused; and a quantization portion for quantizing outputs from the light-sensitive cells contained in a quantization and conversion range of each sensor array having a preset width. The width of the quantization and conversion range is determined by first and second reference voltages. The first reference voltage is set to a common value where the outputs from the sensor arrays are quantized. The second reference voltage is set to a different value for each different sensor array or for each different light-sensitive cell. In this configuration, the output from each light-sensitive cell is quantized by the quantizing portion. This makes it possible to correct the sensitivities of the sensor arrays or light-sensitive cells according to the amount of incident light. Furthermore, the configuration can be simplified because only one of the two reference voltages is varied.

In a fourth embodiment of the invention, the above-described second reference voltage is set according to the difference between the outputs from the sensor arrays or from the light-sensitive cells which are produced when images from a common measurement region are brought to a focus. In this configuration, the sensitivities of the sensor arrays can be corrected according to the amount of incident light by quantizing the outputs from the sensor arrays.

A fifth embodiment of the invention is a rangefinder comprising the above-described image signal output device and a control portion for finding a measurement value that varies according to the distance to the subject based on the output from the quantizing portion corresponding to the outputs from the sensor arrays. The rangefinding accuracy is improved.

A sixth embodiment of the invention is an imaging device comprising the above-described rangefinder, an objective lens, a focusing portion on which an image of the subject passed through the objective lens is focused, and a focusing control portion for performing a focusing operation between the objective lens and the focusing portion according to the measurement value found by the control portion. The focusing accuracy is improved, and the imaging accuracy is enhanced.

DESCRIPTION OF THE PREFERRED EMBODIMENTS

Embodiments of the present invention are hereinafter described with reference to the accompanying drawings.

Figure 1:
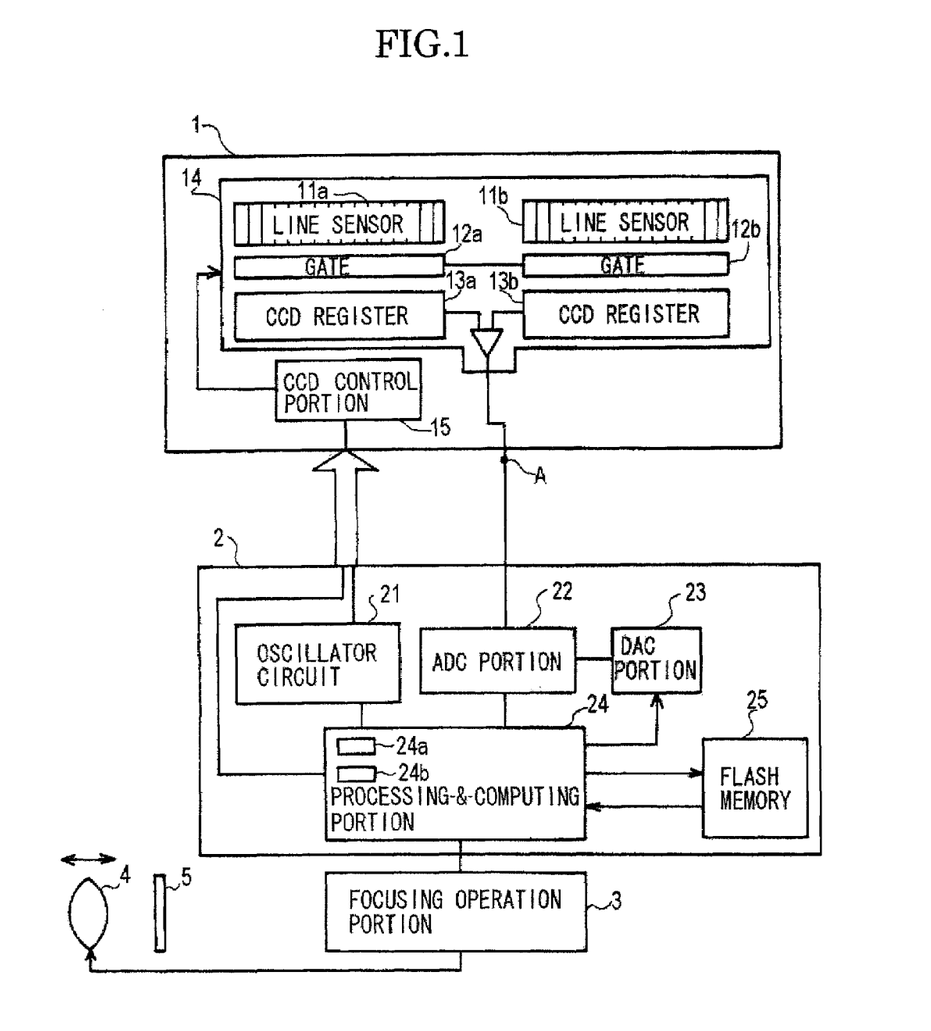
FIG. 1 is a block circuit diagram showing one embodiment of the present invention.

In FIG. 1, a CCD module 1 includes a CCD solid-state imaging device 14 and a CCD control portion 15 for controlling the operation of the imaging device 14. This imaging device 14 is fitted with a pair of photoelectric converter line sensor portions 1a, 11b, gateportions 12a, 12b, and CCD shift registers 13a, 13b.

The photoelectric converter line sensor portions (hereinafter referred to as the line sensor portions) 11a and 11b acting as sensor arrays are charge-accumulating light-sensitive elements, and each sensor portion has a plurality of pixels (light-sensitive cells). An image of a subject that is an object under measurement is focused onto the line sensor portions by a focusing optical system (not shown) such as lenses different from a photography lens, and these line sensor portions produce electric charge corresponding to the focused image.

The operation of the gate portions 12a and 12b is controlled by the CCD control portion 15. This controls accumulation of electric charge in the line sensor portions 11a and 11b. In particular, when the gate portions 12a and 12b are closed, the line sensor portions 11a and 11b can accumulate electric charge. The accumulation of electric charge ends by opening the gate portions 12a and 12b.

The operation of the CCD shift registers (hereinafter referred to as the CCD registers) 13a and 13b is controlled by the CCD control portion 15. Electric charge (pixel outputs) accumulated in the line sensor portions 11a and 11b is transferred via the gate portions 12a and 12b, respectively. When the transfer ends, outputs corresponding to the transferred electric charge that was accumulated are serially output from the terminal A. In the present embodiment, the value of the output from the terminal A decreases with increasing the amount of charge which was accumulated and transferred from the line sensor portions 11a and 11b. Therefore, when no electric charge is stored in the line sensors 11a and 11b and no light is incident on them, the terminal A produces a maximum value of output. The terminal produces a decreasing value with increasing the amount of charge accumulated in the line sensor portions 11a and 11b.

The CCD control portion 15 produces a readout gate pulse, a transfer pulse, and other pulses necessary to drive the imaging device 14. The gate pulse is produced to the gate portions 12a and 12b. The transfer pulse is produced to the CCD registers 13a and 13b. Pulses delivered from the CCD control portion 15 are created based on the output from an oscillator circuit 21 within a one-chip microcomputer 2. The operation is controlled by a processing-and-computing portion 24 within the one-chip microcomputer 2. Consequently, the readout gate pulse, the transfer pulse, and other pulses produced to the imaging device 14 from the CCD control portion 15 are managed by the processing-and-computing portion 24.

The one-chip microcomputer 2 includes the oscillator circuit 21, an A/D converter portion 22, a D/A converter portion 23, the processing-and-computing portion 24, and a nonvolatile memory (hereinafter referred to as the flash memory) 25 that is electrically writable and erasable on a block basis.

The oscillator circuit 21 produces main clock pulses and clock pulses as mentioned above to drive the imaging device 14.

The A/D converter portion 22 acting as a quantizing portion converts the outputs of the line sensor portions 11a and 11b which are delivered from the terminal A into digital values and sends them to the processing-and-computing portion 24.

Figure 3:
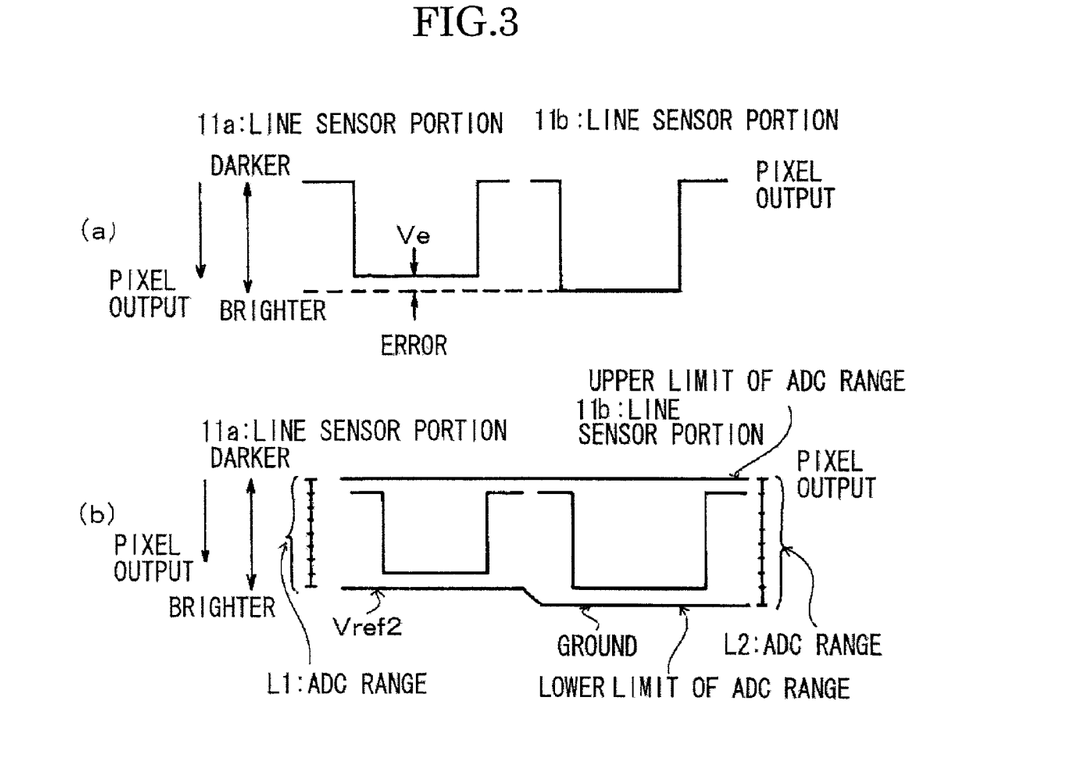
FIG. 3 is a view illustrating the operating principle of the circuit of FIG. 1.

The D/A converter portion 23 acting as reference voltage-varying means can deliver one of higher and lower reference voltages which determine the A/D conversion range (quantization and conversion range) of the A/D converter portion 22, the reference voltages being indicated by L1 and L2, respectively, in FIG. 3B. In the present embodiment, the D/A converter portion 23 can set the lower one of the higher and lower reference voltages determining the A/D conversion range (quantization and conversion range) of the A/D converter portion 22. The A/D conversion range is divided into 256 regions. The output from each light-receiving portion of the line sensor portions 11a and 11b which is contained in each of these regions is quantized (i.e., the output is quantized into 256 values). The number of values obtained by quantization of the A/D converter portion 22 is not limited to 256. The number may be changed appropriately. That is, the regions into which the A/D conversion range is divided is not limited to 256 in number but rather any appropriate modification is possible.

The processing-and-computing portion 24 acting as a control portion calculates a measurement value corresponding to the range, or distance, to the subject, based on the pixel outputs from the line sensor portions 11a and 11b. The pixel outputs are applied from the A/D converter portion 22 and converted into digital values. The processing-and-computing portion 24 cooperates with the flash memory 25 in which a control program is stored, to control various operations. The measurement value corresponding to the distance to the subject is found by performing well-known, so-called correlation calculations. These correlation calculations are briefly described below. Pixel outputs from the line sensor portion 11a that are converted into digital values and pixel outputs from the line sensor portion 11b that are converted into digital values are shifted with respect to each other and the correlation between them is calculated. Based on the amount of shift indicating a high correlation, the amount of deviation (a measurement value varying according to the distance to the subject) is found from the reference positions (i.e., where an image of an infinitely distant subject is focused) set on the line sensor portions 11a and 11b, respectively. For example, the distance to the subject is found, based on the found amount of deviation and on Eq. (1) above.

The control program and various adjustment values such as output set voltage Vref2 at which the D/A converter portion 23 is set to make a sensitivity correction are stored in the flash memory 25. This memory operates in cooperation with the processing-and-computing portion 24.

The focusing operation portion 3 performs a focusing operation between the objective lens 4 and the focusing portion 5, based on the measurement value varying according to the output from the processing-and-computing portion 24, the output indicating the distance to the subject. During this focusing operation, either the objective lens 4 or the focusing portion 5 may be moved. An image of the subject passed through the objective lens 4 is focused onto the focusing portion 5. In a so-called silver halide camera, silver halide film is placed at the location of the focusing portion 5. In a digital still camera, a CCD imaging device or CMOS imaging device is placed at the location of the focusing portion 5.

Figure 2:
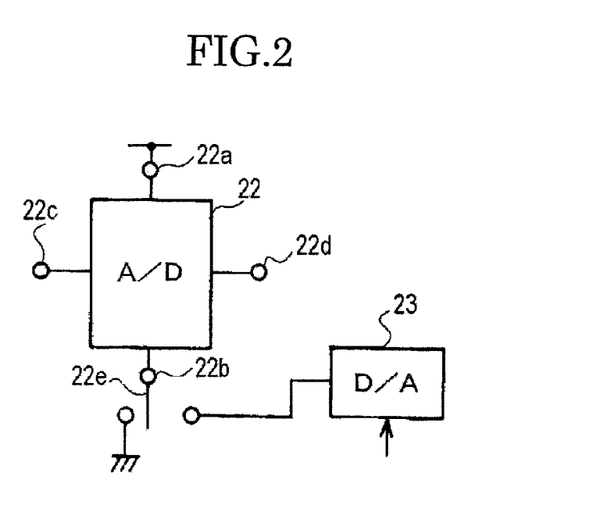
FIG. 2 is a detailed view of main portions of FIG. 1.

FIG. 2 shows the relation between the A/D converter portion 22 and the D/A converter portion 23 of FIG. 1. Those components which are identical with their counterparts of FIG. 1 are indicated by the same symbols as in FIG. 1.

In this figure, 22a is a higher reference voltage application terminal for defining the upper limit of the A/D conversion range of the A/D converter portion 22. In the present embodiment, the terminal is connected with the higher potential side of a power supply (not shown). 22b is a lower reference voltage application terminal for defining the lower limit of the A/D conversion range of the A/D converter portion 22.

In the present embodiment, it can be connected either with the lower potential side of the power supply or with the output of the D/A converter portion 23 via a switching portion 22e. 22c and 22d are an input terminal and an output terminal, respectively. As mentioned previously, the A/D converter portion 22 divides the A/D conversion range into 256 subranges, converts the pixel output from the terminal 22c into 256 values, and delivers the values from the terminal 22d. The widths of the 256 subranges vary according to the A/D conversion range, which in turn varies according to variations in the voltage value applied to the terminal 22b. In the A/D conversion range shown in FIG. 2, every 32 subranges of the 256 subranges are summarized into one, for simplicity of illustration, and scales are given.

Adjustment of the reference voltages of the A/D converter portion 22 is next described summarily by referring to FIG. 3.

FIG. 3A shows the pixel outputs of the line sensor portions 11a and 11b which are produced when images (light fluxes) coming from a subject and having the same brightness are focused (in practice, the outputs appear from the terminal A). At this time, the terminal 22b of the A/D converter portion 22 is connected with the lower potential side of the power supply by the switching portion 22e.

As shown in this figure, the line sensor portions 11a and 11b are made to receive the images (light fluxes) coming from the subject and having the same brightness. If different outputs appear due to a difference in sensitivity between the line sensor portions 11a and 11b, a differential output (sensitivity difference) Ve corresponding to the difference is detected. As shown in FIG. 3B, when the outputs from the line sensor portions 11a and 11b are A/D converted, the analog-to-digital conversion range is switched based on the detected value Ve between the line sensor portions 11a and 11b. In particular, the range width-determining value side of the A/D conversion range corresponding to the outputs from the line sensor portions 11a and 11b where the amount of incident light is large is switched based on a value corresponding to the detected value of Ve.

By switching the A/D conversion range according to the output difference (sensitivity difference) in this way, both outputs disappear where the amount of incident light is absent, for example. As the amount of incident light increases, the output difference between the pair of light-receiving portion arrays increases. During A/D conversion, the outputs from the pair of light-receiving portion arrays are corrected for sensitivity according to the amount of incident light. Consequently, the problem with related art (i.e., data (fixed value) for correction of sensitivity is output intact when the amount of incident light is not present) is eliminated.

Figure 4:
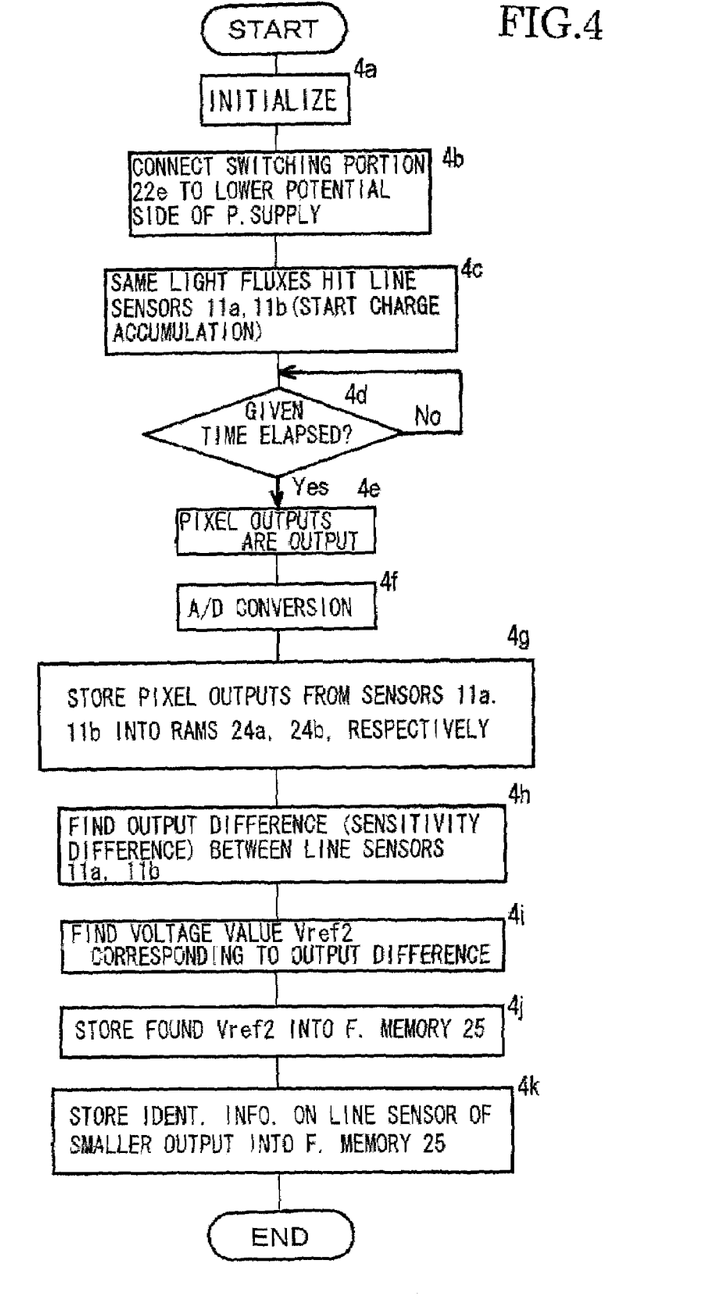
FIG. 4 is a flowchart illustrating the operation of the circuit of FIG. 1.

The operation for adjusting the reference voltages of the A/D converter portion 22 is next described by referring to FIG. 4. This operation is carried out during an adjustment prior to shipment.

When the power supply is turned on, the CCD registers 13a, 13b, processing-and-computing portion 24, and CCD control portion 15 are initialized (step 4a). The switching portion 22e is connected to the lower potential side of the power supply (step 4b).

The line sensor portions 11a and 11b are made to receive images of the subject having the same brightness. These line sensor portions 11a and 11b start an operation for accumulating electric charge (step 4c). Preferably, the value of the brightness used at this time corresponds to a maximum allowable brightness.

When a given time has passed since start of accumulation of electric charge (step 4d), the electric charge accumulated at the pixels of the line sensor portions 11a and 11b is transferred as pixel outputs to the CCD registers 13a and 13b via the gate portions 12a and 12b. The transferred pixel outputs are output serially from the terminal A (step 4e).

The pixel outputs from the line sensor portions 11a and 11b which are serially delivered from the terminal A are quantized (i.e., converted into digital values) by the A/D converter portion 22 within the one-chip microcomputer 2 and output to the processing-and-computing portion 24 (step 4f). That is, in step 4f, the pixel outputs from the line sensor portions 11a and 11b are A/D converted with a common A/D conversion range.

The processing-and-computing portion 24 stores the pixel output from the line sensor portion 11a, which is applied from the A/D converter portion 22, into its internal RAM 24a and stores the pixel output from the line sensor portion 11b into its internal RAM 24b (step 4g). The processing-and-computing portion 24 compares the values within the RAM 24a with the values within the RAM 24b and finds their differences (step 4h). In step 4h, the averages of the values within the RAMs 24a and 24b, respectively, may be calculated, and the difference between these calculated average values may be computed. Alternatively, the difference between their respective maximum or minimum values may be found. Since images (light fluxes) of a subject having the same brightness are made to hit the line sensor portions 11a and 11b in this embodiment, the difference found in step 4h is the difference in sensitivity between the line sensor portions 11a and 11b.

The aforementioned steps 4g and 4h are described by taking FIG. 3A as an example. The output from the line sensor portion 11a shown in FIG. 3A is stored in the RAM 24a, while the output from the line sensor portion 11b is stored in the RAM 24b (step 4g). The difference Ve between them (sensitivity difference) is found (step 4h).

The processing-and-computing portion 24 finds a voltage value Vref2 corresponding to the difference (sensitivity difference) found in step 4g (step 4i). The voltage difference Vref2 found in step 4i is a voltage value used to set the output of the D/A converter portion 23. For instance, it may be the above-described Ve, and is stored in a given block within the flash memory 25 (step 4j).

Subsequently, the value within the RAM 24a is compared with the value within the RAM 24b, and the RAM holding the smaller one is selected. Information about identification of the line sensor portion whose output is stored in the selected RAM is stored in a given block within the flash memory 25 (step 4k). In the present embodiment, in case of the line sensor portion 11a, the information about the identification is "11a". In case of the line sensor portion 11b, the information is "11b".

The steps 4i to 4k are described by taking FIG. 3 as an example. Vref2 corresponding to Ve of FIG. 3A is found. This Vref2 is stored into a given block within the flash memory 25 (step 4j). Identification Information about the line sensor portion 11a such as "11a" is stored into a given block within the flash memory 25 (step 4k).

Figure 5:
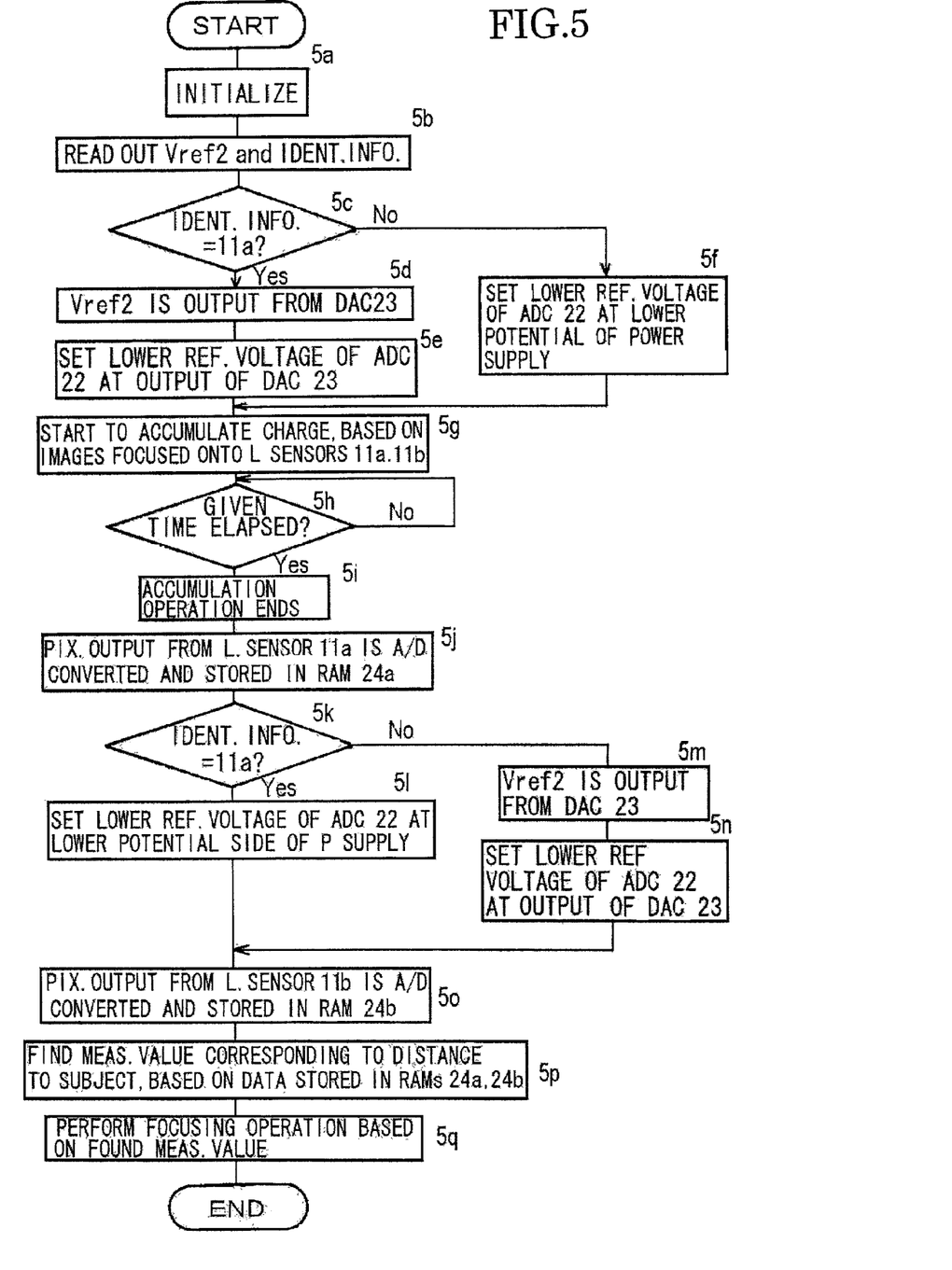
FIG. 5 is a flowchart illustrating the operation of the circuit of FIG. 1.

The operation in actual use is next described in detail by referring to FIGS. 3 and 5.

When the power supply is turned on, the CCD registers 13a, 13b, processing-and-computing portion 24, and CCD control portion 15 are initialized (step 5a).

When the initialization ends, the identification information about the line sensor portion and the voltage value Vref2 for setting of the D/A converter portion 23 which are stored in the given blocks of the flash memory 25 are read out (step 5b).

If the identification information (IDENT. INFO.) read from the flash memory 25 is "11a" corresponding to the line sensor portion 11a (step 5c), a voltage value corresponding to the Vref2 read from the flash memory 25 is delivered from the D/A converter (DAC) portion 23 (step 5d). The switching portion 22e of the A/D converter portion 22 is connected with the side of the D/A converter portion 23. The output from the D/A converter (DAC) portion 23 is supplied to the lower reference voltage application terminal 22b of the A/D converter (ADC) portion 22 to thereby adjust the conversion range of the A/D converter portion 22 (step 5e).

If the identification information read from the flash memory 25 is "11b" corresponding to the line sensor portion 11b (step 5c), the switching portion 22e of the A/D converter portion 22 is connected with the lower potential side of the power supply. The lower potential of the power supply is supplied to the lower reference voltage application terminal 22b of the A/D converting portion 22, thus adjusting the conversion range of the A/D converter portion 22 (step 5f).

When the adjustment ends, the line sensor portions 11a and 11b start to accumulate electric charge, based on images of the subject for which the distance is to be measured (step 5g). The images are focused through a light-receiving lens (not shown) on the line sensor portions 11a and 11b. When a given time has passed since the operation for the accumulation, the pixel outputs from the line sensor portions 11a and 11b are transferred to the CCD registers 13a and 13b, thus ending the accumulation operation (steps 5h and 5i).

The pixel output from the line sensor portion 11a is serially output from the CCD register 13a. The output is converted into digital values by the A/D converter (ADC) portion 22 and stored in the RAM 24a (step 5j).

When the storage into the RAM 24a ends, a decision is made as to whether the identification information read from the flash memory 25 in step 5b corresponds to the line sensor portion 11a (step 5k). If so, the switching portion 22e of the A/D converter portion 22 is connected to the lower potential side of the power supply. The lower potential of the power supply is supplied to the lower reference voltage input terminal 22b of the A/D converter (ADC) portion 22. Thus, the conversion range of the A/D converter portion 22 is adjusted (step 5l).

If the result of the decision made in step 5k is that the identification information is "11b" corresponding to the line sensor portion 11b, a voltage value corresponding to the Vref2 read out from the flash memory 25 is delivered from the D/A converter portion 23 (step 5m). The switching portion 22e of the A/D converter portion 22 is connected to the side of the D/A converter portion 23. The output from the D/A converter portion 23 is supplied to the lower reference voltage input terminal 22b of the A/D converter portion 22, thus adjusting the conversion range of the A/D converter portion 22 (step 5n).

The pixel output from the line sensor portion 11b is output serially from the CCD register 13b. The output is converted into digital values in the A/D converter portion 22 and stored into the RAM 24b (step 5o). Since the A/D conversion range is switched depending on whether the pixel output from the line sensor portion 11a is A/D converted or the pixel output from the line sensor portion 11b is A/D converted (more correctly, the A/D conversion range is switched based on the output difference (sensitivity difference) between the line sensor portions), the sensitivity difference between the line sensor portions can be corrected according to the amount of incident light by the A/D converter portion 22 simply by A/D conversion.

A measurement value corresponding to the distance to the subject is found, based on data stored in the RAMs 24a and 24b (step 5p). The step 5p is performed using the aforementioned correlation calculation. Since a measurement value corresponding to the distance to the subject is found, based on the pixel outputs from the line sensor portions whose sensitivities are corrected according to the amount of incident light in this manner, the range finding accuracy can be improved.

Subsequently, a focusing operation is performed, based on the found measurement value. Procedures of related art may be applied to this portion and so its detailed description is omitted (step 5q). Because a focusing operation is carried out according to a measurement value corresponding to the distance to the subject that is found based on the pixel outputs from the line sensor portions in this way, the focusing accuracy is enhanced, it being noted that the sensitivities of the line sensor portions are corrected according to the amount of incident light.

The gist of the operation mentioned previously is described, based on the example shown in FIG. 3. The Vref2 read out in step 5b is a value corresponding to Ve. The identification information read out also in step 5b is "11a". Therefore, control goes from 5c to step 5d and then to 5e. The A/D conversion range of the A/D converter portion 22 is L1 of FIG. 3B. Therefore, the pixel output from the line sensor portion 11a is converted into 256 values, based on the A/D conversion range L1, and stored in the RAM 24a. Because the identification information read out in step 5b is "11a", control proceeds to step 51, where the pixel output from the line sensor portion 11b is converted into 256 values, based on the A/D conversion range L2, and stored in the RAM 24b.

Since the A/D conversion range varies according to the output difference (sensitivity difference) between the line sensor portions 11a and 11b in this way, the output difference (sensitivity difference) between the line sensor portions 11a and 11b can be corrected simply by performing an A/D conversion according to the varied A/D conversion range. When the A/D conversion range is changed, only one of the two reference voltages determining the A/D conversion range is modified and so the modification can be easily made. Furthermore, the A/D conversion range is varied according to the output difference (sensitivity difference) to correct the output difference (sensitivity difference) between the line sensor portions 11a and 11b, unlike related art in which a given value corresponding to the sensitivity difference is added to, or subtracted from, the outputs from the line sensor portions 11a and 11b. In consequence, the sensitivities of the line sensor portions 11a and 11b can be corrected according to the amount of incident light.

Figure 6:
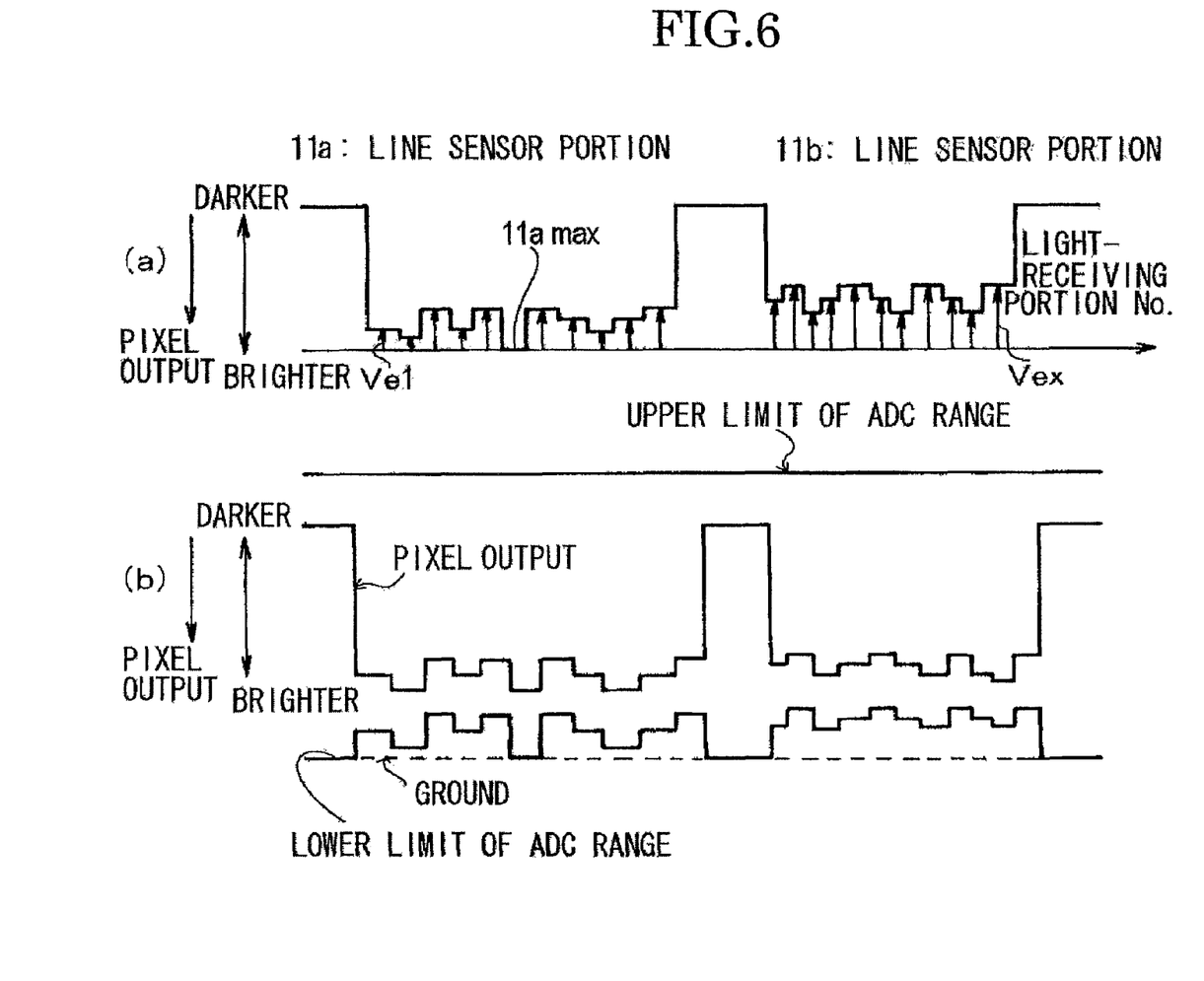
FIG. 6 is a diagram illustrating data used for settings of a D/A converter portion used in another embodiment of the invention.

In the example given above, the A/D conversion range is modified according to the output difference (sensitivity difference) between the line sensor portions 11a and 11b. As shown in FIG. 6, the A/D conversion range may be varied according to the output variations (sensitivity variations) among individual light-receiving elements of the line sensor portions 11a and 11b. FIG. 6A shows sensitivity variations between light-receiving portions when uniform measurement light of given brightness is made to hit the line sensor portions 11a and 11b. In this figure, the horizontal axis indicates the number (No.) given to the order of arrangement of each light-receiving portion. The vertical axis indicates the A/D converted pixel output of each light-receiving portion where the A/D conversion range is maintained constant. In this case, Ve1 to Vex are detected at a maximum one (in FIG. 6A, "11amax") of pixel outputs. Vref21 to Vref2X (hereinafter abbreviated as "Vref2n") corresponding to the Ve1 to Vex are found and stored in a given block within the flash memory 25 while correlating them with the order (No.) of arrangement given to each light-receiving element. During actual use, the number (No.) given to the order of arrangement of each light-receiving portion corresponding to the number of transferred pulses is found whenever a transferred pulse is produced under control of the processing-and-computing portion 24, by making use of the fact that the number of transferred pulses sent to the imaging device 14 corresponds to the number given to the order of arrangement of each light-receiving portion. Vref2n stored in the flash memory 25 and correlated with the number (No.) given to the order of arrangement of each light-receiving portion is read out, and the output of the D/A converter portion 23 is set. The width of the A/D conversion range is modified based on the output of the D/A converter portion 23 set in this way. In this case, where the lower potential side of the power supply (e.g., ground) is used as Vref2n corresponding to the maximum one of pixel outputs ("11amax" in FIG. 6A), the maximum width of the A/D conversion range can be set larger (see FIG. 6B). As a result, the aforementioned effects are produced. In addition, the sensitivity of each light-receiving portion can be corrected. Moreover, the rangefinding accuracy can be enhanced.

The embodiment described above adopts a structure in which the voltage values of the outputs from the line sensor portions 11a and 11b applied to the A/D converter portion 22 actually decrease with increasing pixel output. Therefore, the lower limit determining the A/D conversion range of the A/D converter portion 22 is modified according to the sensitivity difference. Where a structure is adopted in which the voltage values of the outputs from the line sensor portions 11a and 11b applied to the A/D converter portion 22 increase with increasing pixel output, the upper limit determining the A/D conversion range of the A/D converter portion 22 is preferably modified according to the sensitivity difference.

In the case of a digital still camera where a CCD imaging device or CMOS imaging device is installed in the focusing portion 5, light-sensitive cells within the CCD or CMOS imaging device installed in the focusing portion 5 may be used as the line sensor portions 11a and 11b. That is, light-sensitive cells within the CCD or CMOS imaging device as described above constitute the pair of line sensor portions 11a and 11b. Their outputs are applied to the A/D converter portion 22, thus modifying the A/D conversion range as mentioned previously.

Where images focused onto the line sensor portions 11a and 11b pass through the objective lens 4 (TTL), reference positions set on the line sensor portions 11a and 11b are the positions of images of the subject focused onto the line sensor portions 11a and 11b when the objective lens 4 is in its focal position.

In accordance with the present invention, the width of a quantization and conversion range is modified according to the sensitivity difference between sensor arrays or between light-sensitive cells. Therefore, the sensitivities of the sensor arrays can be corrected according to the amount of incident light during quantization. Hence, the rangefinding accuracy and focusing accuracy can be improved.

What is claimed is:

1. An image signal output device comprising:
   a pair of sensor arrays each consisting of a plurality of light-sensitive cells onto which an image from a subject is focused; and
   a quantization portion for quantizing outputs from said light-sensitive cells contained in a quantization and conversion region of each sensor array having a preset width;
   wherein the width of said quantization and conversion region is varied and determined during quantization by first and second reference voltages;
   wherein said first reference voltage is set to a common value where the outputs from the sensor arrays are quantized; and
   wherein said second reference voltage is set to a different value for each different sensor array or for each different light-sensitive cell.

2. The image signal output device of claim 1, wherein said second reference voltage is set according to a difference between the outputs from the sensor arrays or from the light-sensitive cells which are produced when images from a common measurement region are brought to a focus.

3. A rangefinder comprising an image signal output device set forth in either claim 3 or 2 and a control portion for finding a measurement value that varies according to the distance to the subject based on an output from the quantizing portion corresponding to outputs from said sensor arrays.

4. An imaging device comprising:
   a rangefinder set forth in claim 3;
   an objective lens;
   a focusing portion onto which an image of the subject passed through said objective lens is focused; and
   a focusing control portion for performing a focusing operation between said objective lens and said focusing portion according to said measurement value found by said control portion.

* * * * *